US012475269B1

(12) United States Patent
Yang et al.

(10) Patent No.: US 12,475,269 B1
(45) Date of Patent: Nov. 18, 2025

(54) METHOD FOR SIMULATING CONSTRUCTION OF SHAFT BORING MACHINE, DEVICE, MEDIUM, AND PRODUCT

(71) Applicants: University of Science and Technology Beijing, Beijing (CN); China University of Mining and Technology, Beijing, Beijing (CN)

(72) Inventors: Renshu Yang, Beijing (CN); Xinmin Ma, Beijing (CN); Shuo Zhang, Beijing (CN); Feixiang Lu, Beijing (CN); Yiyin Hu, Beijing (CN); Liyun Yang, Beijing (CN)

(73) Assignees: University of Science and Technology Beijing, Beijing (CN); China University of Mining and Technology, Beijing, Beijing (CN)

( * ) Notice: Subject to any disclaimer, the term of this patent is extended or adjusted under 35 U.S.C. 154(b) by 0 days.

(21) Appl. No.: 19/209,834

(22) Filed: May 16, 2025

(30) Foreign Application Priority Data

Jul. 16, 2024 (CN) .......................... 202410954878.2

(51) Int. Cl.
*G06F 30/10* (2020.01)
*G06F 30/23* (2020.01)
*G06T 17/20* (2006.01)

(52) U.S. Cl.
CPC .............. *G06F 30/10* (2020.01); *G06F 30/23* (2020.01); *G06T 17/20* (2013.01)

(58) Field of Classification Search
CPC .......... G06F 30/10; G06F 30/23; G06T 17/20
See application file for complete search history.

(56) References Cited

U.S. PATENT DOCUMENTS

| 2019/0284909 | A1* | 9/2019 | Spencer | ................. G06N 20/20 |
| 2019/0370424 | A1* | 12/2019 | Han | ........................ G01N 33/24 |
| 2022/0108047 | A1* | 4/2022 | Cheng | ..................... G06F 30/17 |

OTHER PUBLICATIONS

D. Feng, H. Wu, R. Chen, F. Liu, and M. Yao, "An analytical model to predict the radial deformation of surrounding rock during shaft construction via shaft boring machine", pp. 1-15, (Year: 2023).*

(Continued)

*Primary Examiner* — Kibrom K Gebresilassie
(74) *Attorney, Agent, or Firm* — Bayramoglu Law Offices LLC

(57) ABSTRACT

A method for simulating construction of a shaft boring machine, a device, a medium, and a product are provided The method includes: constructing a numerical model for construction simulation by using a finite element numerical simulation platform; configuring interaction simulation parameters, boundary conditions and an initial state of the numerical model for construction simulation; simulating a boring process of the boring machine that advances axially segment by segment with a predetermined advancing distance in the parameter-configured numerical model for construction simulation; at the end of each segment of advancement, constructing a support structure model on an exposed surrounding rock contact surface of a current advancement segment based on a current support scheme; and at the end of each segment of advancement, simulating a support effect of the support structure based on the support structure model to obtain a simulation result.

9 Claims, 4 Drawing Sheets

(56) References Cited

OTHER PUBLICATIONS

L. Liu, J. Yan, S. Cao, "Numerical Simulation Study on the mechanical properties of the Surrounding Rock in Tunnel Boring Machine Inclined Shaft", pp. 30-36, (Year: 2024).*

* cited by examiner

METHOD FOR SIMULATING CONSTRUCTION OF SHAFT BORING MACHINE, DEVICE, MEDIUM, AND PRODUCT

CROSS-REFERENCE TO THE RELATED APPLICATIONS

This application is based upon and claims priority to Chinese Patent Application No. 202410954878.2, filed on Jul. 16, 2024, the entire contents of which are incorporated herein by reference.

TECHNICAL FIELD

The present disclosure relates to the field of construction simulation, and in particular to a method for simulating construction of a shaft boring machine, a device, a medium, and a product.

BACKGROUND

Shaft engineering is an essential component of mine construction and serves as the primary and key project for developing deep resources and utilizing underground space. The construction of deep shafts is a significant direction in deep-earth scientific research. The shaft boring machine (SBM) is regarded as a key direction for the development of the construction of deep and large shafts due to its ability to achieve multiple construction processes in parallel, large shaft diameter, high construction efficiency, high degree of mechanization, and close attention on environmental protection and safety. However, with the deepening of shaft engineering, well construction conditions such as high geo-stress, high ground temperature, and complex geological structures are becoming increasingly prominent. Nonlinear instability failures, including spalling, buckling, rock burst, large deformations in soft and fractured surrounding rock, and brittle-ductile deformations, have significantly increased, making the control and maintenance of the stability of surrounding rock in deep shafts face severe challenges.

Weak rock strata, due to their unique mechanical properties and geological structural characteristics, have become a highly challenging geological environment during the excavation of deep shafts. Such rock strata typically exhibit low strength, poor integrity, high porosity, and significant rheological properties. They thus are prone to deformation, fracturing, and even instability under stress, which significantly increases the difficulty of shaft excavation and support. Therefore, optimizing the construction scheme and predicting possible problems are extremely important.

The construction process is usually simulated to optimize the construction scheme. The current construction simulation methods are generally affected by the accuracy and applicability of the established model. If the model is inaccurate or excessively simplified, the reliability of the results may be affected. Therefore, the existing simulation methods are cumbersome and low in simulation accuracy.

SUMMARY

An objective of the present disclosure is to provide a method for simulating construction of a shaft boring machine, a device, a medium, and a product, which can simply and accurately implement the simulation of the construction process, thus optimizing the construction scheme.

To achieve the objective above, the present disclosure provided the following technical solutions.

In a first aspect, the present disclosure provides a method for simulating construction of the shaft boring machine, including:

constructing a numerical model for construction simulation by using a finite element numerical simulation platform, wherein the numerical model for construction simulation includes a boring part model of a boring machine, a three-dimensional model of a surrounding rock, and a constitutive model for a surrounding rock material;

configuring interaction simulation parameters, boundary conditions, and an initial state of the numerical model for construction simulation to obtain a parameter-configured numerical model for construction simulation;

simulating a boring process of the boring machine that advances axially segment by segment with a predetermined advancing distance in the parameter-configured numerical model for construction simulation, wherein a load identical to an actual boring thrust is applied at an excavation front at the beginning of each segment of advancement;

constructing a support structure model on an exposed surrounding rock contact surface of a current advancement segment based on a current support scheme at the end of each segment of advancement, during simulating the boring process; and simulating a support effect of a support structure based on the support structure model at the end of each segment of advancement to obtain a simulation result, during simulating the boring process, wherein the simulation result includes a contact pressure between the support structure and the surrounding rock, a relative displacement change between the support structure and the surrounding rock, and stress distribution of the support structure, the simulation result is used for determining a factor of safety of a construction process, and the factor of safety is used for optimizing the current support scheme.

In some embodiments, constructing a numerical model for construction simulation by using a finite element numerical simulation platform includes:

constructing the boring part model of the boring machine by using a built-in mesh generation model in Fast Lagrangian Analysis of Continua in 3 Dimensions (FLAC3D) software based on actual data of a boring part of the boring machine, where the actual data includes actual dimension, shape, and weight of a device;

constructing the three-dimensional model of the surrounding rock by using the built-in mesh generation model in the FLAC3D software based on geological survey data, where the geological survey data include types, thicknesses, and physical and mechanical properties of rock strata; and setting a Mohr-Coulomb constitutive model in the FLAC3D software as the constitutive model for the surrounding rock material.

In some embodiments, configuring interaction simulation parameters, boundary conditions, and an initial state of the numerical model for construction simulation includes:

simulating an interaction between the support structure and the surrounding rock, and defining the interaction simulation parameters, where the interaction simulation parameters include a normal contact force on a contact surface between the support structure and the surrounding rock, a tangential contact force on the contact surface between the support structure and the surrounding rock, a friction coefficient on the contact surface between the support structure and the surrounding rock, and a relative displacement between the support structure and the surrounding rock;

setting the boundary conditions of the numerical model for construction simulation, where the boundary conditions include a fixed boundary, a displacement boundary, and a load boundary; and initializing geo-stress distribution of the numerical model for construction simulation based on the geological survey data, and setting an initial displacement of the numerical model for construction simulation to zero to complete setting of the initial state.

In some embodiments, simulating a boring process of the boring machine that advances axially segment by segment with a predetermined advancing distance in the parameter-configured numerical model for construction simulation includes:

selecting an area to be excavated in the parameter-configured numerical model for construction simulation; and simulating the boring process of the boring machine, that advances axially segment by segment with the predetermined advancing distance, in the area to be excavated by using a void element technique.

In some embodiments, constructing a support structure model on an exposed surrounding rock contact surface of a current advancement segment based on a current support scheme at the end of each segment of advancement, during simulating the boring process includes:

in a case determining that a form of the support structure in the current support scheme is a concrete shaft wall, during simulating the boring process, simulating a geometrical shape and mechanical properties of the concrete shaft wall by using a built-in shell element in FLAC3D software at the end of each segment of advancement, to obtain the support structure model on the exposed surrounding rock contact surface of the current advancement segment; and in a case determining that the form of the support structure in the current support scheme is an anchor bolt, during simulating the boring process, simulating a length, a diameter and pre-stress of the anchor bolt by using a built-in anchor cable element in the FLAC3D software at the end of each segment of advancement to obtain the support structure model on the exposed surrounding rock contact surface of the current advancement segment.

In some embodiments, the method for simulating construction of the shaft boring machine further includes:

calculating the maximum principal stress of the support structure based on the stress distribution of the support structure in the simulation result; and calculating the factor of safety of the construction process based on the maximum principal stress and the axial compressive strength of the support structure.

In some embodiments, the method for simulating construction of the shaft boring machine further includes:

in response to determining that the factor of safety is less than or equal to a predetermined value, adjusting current support timing, support parameters, and a form of the support structure to optimize the current support scheme; and in response to determining that the factor of safety is greater than the predetermined value, maintaining the current support scheme.

In a second aspect, the present disclosure provides a computer device, including a memory, a processor, and a computer program stored on the memory and executable on the processor. The processor, when executing the computer program, is configured to implement the method for simulating construction of the shaft boring machine above.

In a third aspect, the present disclosure provides a computer readable storage medium, having a computer program stored therein, wherein the computer program, when executed by a processor, can implement the method for simulating construction of the shaft boring machine above.

In a fourth aspect, the present disclosure provides a computer program product, including a computer program. The computer program, when executed by a processor, can implement the method for simulating construction of the shaft boring machine above.

According to specific embodiments of the present disclosure, the present disclosure has the following technical effects.

The present disclosure provides a method for simulating construction of the shaft boring machine, a device, a medium, and a product. Based on a construction simulation numerical model constructed by using a finite element numerical simulation platform, a boring process of the boring machine that advances axially segment by segment with a predetermined advancing distance is simulated, and the support effect of a support structure at the end of each segment of advancement is simulated. By using a numerical simulation technology of the finite element numerical simulation platform, the whole construction process can be simulated in detail for simple and accurate simulation of the construction process. The simulation result can be used for determining a factor of safety of the construction process, thus providing strong theoretical support for the construction process optimization and safety risk management and control.

BRIEF DESCRIPTION OF THE DRAWINGS

To describe the technical solutions in the embodiments of the present disclosure or the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the scope of protection of the present disclosure.

To make the objectives, features, and advantages of the present disclosure more clear, the present disclosure is further described in detail below with reference to the accompanying drawings and specific embodiments.

Figure 1:
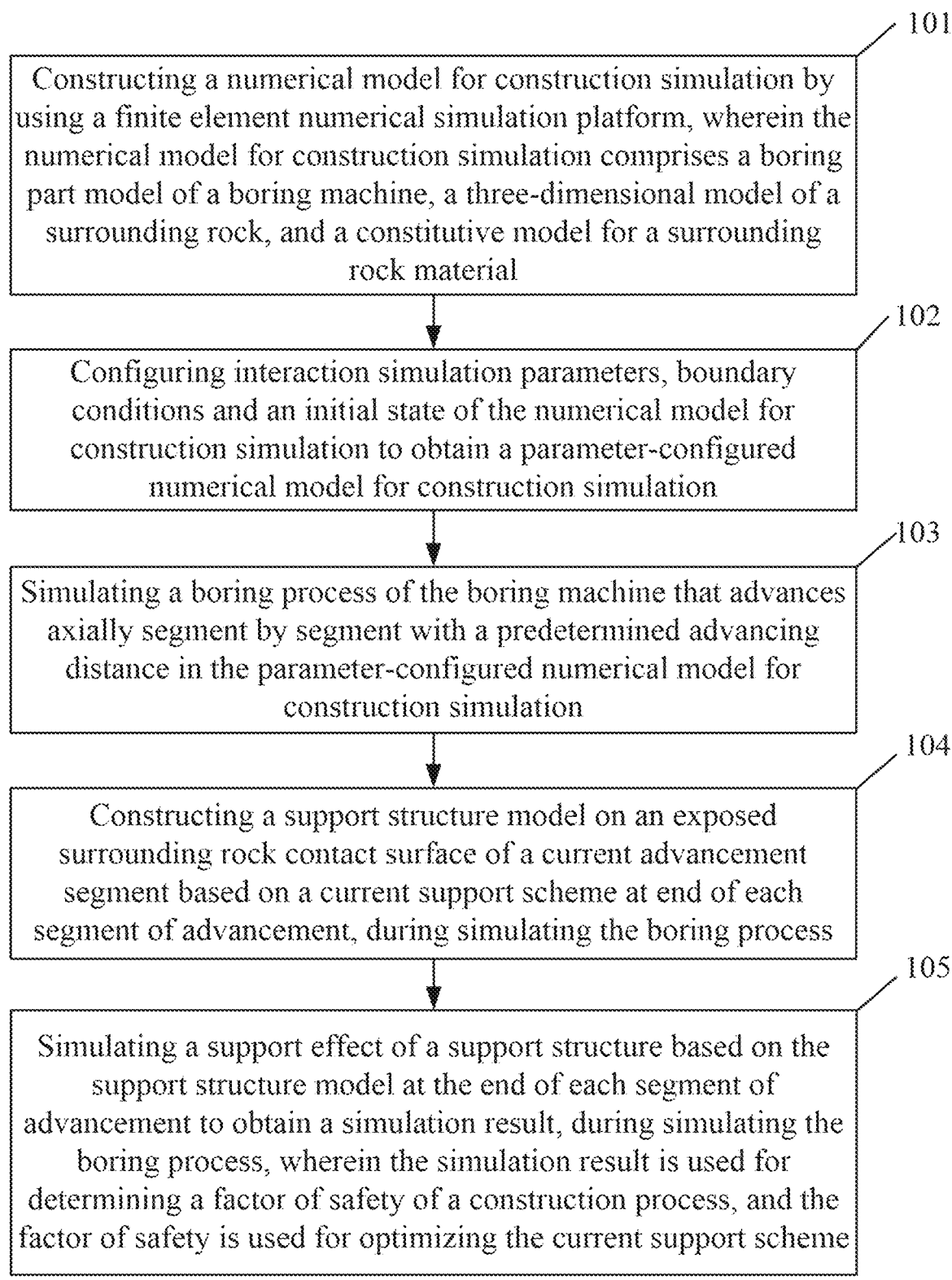
FIG. 1 is a flow diagram of a method for simulating construction of a shaft boring machine according to an embodiment of the present disclosure.

As shown in FIG. 1, an embodiment of the present disclosure provides a method for simulating construction of a shaft boring machine, including steps 101 to 105.

In step 101, a numerical model for construction simulation is constructed by using a finite element numerical simulation platform. The numerical model for construction simulation includes a boring part model of a boring machine, a three-dimensional model of a surrounding rock, and a constitutive model for a surrounding rock material.

In step 102, interaction simulation parameters, boundary conditions, and an initial state of the numerical model for construction simulation are configured to obtain a parameter-configured numerical model for construction simulation.

In step 103, a boring process of the boring machine that advances axially segment by segment with a predetermined advancing distance is simulated in the parameter-configured numerical model for construction simulation.

The load identical to an actual boring thrust is applied at an excavation front at the beginning of each advancement segment.

In step 104, during simulating the boring process, a support structure model is constructed on an exposed surrounding rock contact surface of the current advancement segment based on the current support scheme at the end of each advancement segment.

In step 105, during simulating the boring process, a support effect of the support structure is simulated based on the support structure model at the end of each segment of advancement to obtain a simulation result. The simulation result is used for determining a factor of safety of the construction process, and the factor of safety is used for optimizing the current support scheme.

The simulation result includes a contact pressure between the support structure and the surrounding rock, a relative displacement change between the support structure and the surrounding rock, and stress distribution of the support structure.

The construction process can be simply and accurately simulated by implementing above steps 101 to 105, thus optimizing the construction scheme.

In another exemplary embodiment of the present disclosure, step 101 includes the following.

Figure 2:
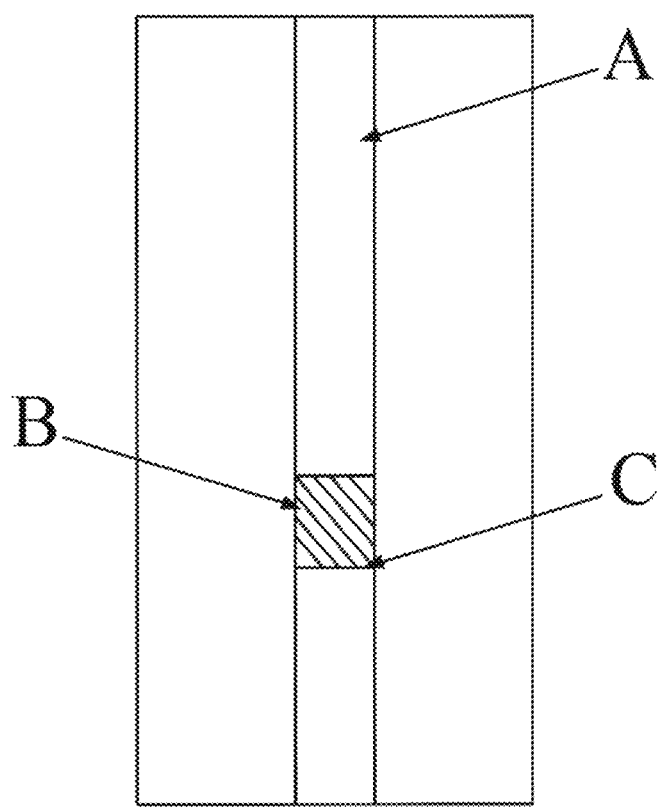
FIG. 2 is a schematic diagram showing a modeling result of a shaft engineering site according to an embodiment of the present disclosure.

(1) A shaft engineering site is modeled. A boring part model of the boring machine is constructed by using a built-in mesh generation model in FLAC3D software based on actual data of a boring part of the boring machine, and a three-dimensional model of the surrounding rock is constructed by using the built-in mesh generation model in the FLAC3D software based on geological survey data. The actual data includes a device's dimension, shape and weight. The geological survey data include types, thicknesses and physical and mechanical properties of rock strata. The boring part of the boring machine may be a cutter head of the boring machine. A modeling result of the shaft engineering site is as shown in FIG. 2. In FIG. 2, A represents a concrete shaft wall (i.e. permanent support), B represents an unsupported section (i.e. temporary support), and C represents an advancing face.

In this step, the boring machine's boring part model and the surrounding rock's three-dimensional model are independently constructed using the built-in mesh generation model in the FLAC3D software, thus achieving the accurate modeling of the boring machine and the fine mesh generation of the surrounding rock.

(2) The Mohr-Coulomb constitutive model in the FLAC3D software is used as a constitutive model for a surrounding rock material.

In this step, given the characteristics of soft strata, the Mohr-Coulomb constitutive model is employed to describe a stress-strain relationship and a failure behavior of the surrounding rock. The model can effectively simulate non-linear characteristics of the rock in the shear failure process (including elastoplastic transformation, strength reduction, and the frictional properties exhibited after failure).

In another exemplary embodiment of the present disclosure, step 102 includes the follows.

(1) An interaction between the support structure and the surrounding rock is simulated, and the interaction simulation parameters are defined. The interaction simulation parameters include a normal contact force on a contact surface between the support structure and the surrounding rock, a tangential contact force on the contact surface between the support structure and the surrounding rock, a friction coefficient on the contact surface between the support structure and the surrounding rock, and a relative displacement between the support structure and the surrounding rock.

In this step, to accurately reflect the interaction effect between the support structure (such as an anchor bolt, a concrete shaft wall, etc.) and the surrounding rock, a built-in Interface contact surface element in the FLAC3D software is configured to define the interaction simulation parameters to simulate the bonding, friction, separation and energy dissipation process between the support structure and the surrounding rock.

(2) Based on engineering constraints of on-site geological conditions (stratigraphic lithology and geo-stress conditions), appropriate boundary conditions are applied to the numerical model for construction simulation to simulate constrained environments in an actual engineering scenario. The boundary conditions include a fixed boundary, a displacement boundary, a load boundary, etc. Meanwhile, the geo-stress distribution of the numerical model for construction simulation is initialized based on the geological survey data to ensure that the simulated geo-stress field is consistent with the actual geological background. Finally, the initial displacement of the numerical model for construction simulation is set as 0 to ensure that the calculation is started from a known and stable initial state, thus completing the setup of the boundary conditions and the initial state.

In another exemplary embodiment of the present disclosure, step 103 includes the following.

An area to be excavated is selected in the parameter-configured numerical model for construction simulation. A boring process of the boring machine that advances axially segment by segment with a predetermined advancing distance is simulated in the area to be excavated using a void element technique. The simulation of the shaft boring process in this step can be described as follows:

(1) Selection of excavation range and simulation by the void element technique: in the parameter-configured numerical model for construction simulation, a surrounding rock with a specific cross-section is selected as the area to be excavated. For example, to study the simulation result of a buried depth at 1,000 m, the model cross-section representing this depth is intercepted to analyze displacement, stress, and other cloud diagrams. The void element technique is used to simulate the actual boring operation; that is, a virtual excavation space is formed by removing the property of rock material at the corresponding position, thus simulating the process of rock cutting by the boring machine.

(2) Simulation of advancement of boring machine: assuming that the cutter head of the boring machine has no expanding effect, only its axial advancement needs to be considered. Contact interface parameters (for example, the simulated thrust of the boring machine to the advancing face) are set on the surface of the surrounding rock to be bored, and the interaction between the cutter head of the boring machine and the surrounding rock is simulated. During simulation, the boring machine advances axially segment by segment, where each advancing distance is set to be 1 m to meet the operation mode of the boring machine during actual construction.

(3) Application of excavation load and update of state: at the moment of simulating boring, a load equivalent to the actual boring thrust is applied at the excavation front (i.e., a tunnel face) to simulate the influence of an excavation force on the surrounding rock, thus monitoring the variations of the stress and deformation in the calculation stage. Between the completion of the current advance and the initiation of the subsequent cycle, the thrust on the excavation front-loaded in the last round needs to be removed in time to update a calculation state, thus ensuring the consistency and accuracy of the simulation.

In another exemplary embodiment of the present disclosure, step 104 includes the following.

(1) If a form of the support structure in the current support scheme is a concrete shaft wall, during simulation of the boring process, a geometrical shape and mechanical properties of the concrete shaft wall are simulated at the end of each segment of advancement by using a built-in shell element in the FLAC3D software and a Fish language (a numerical simulation programming language) programming function of the FLAC3D software, thus obtaining the support structure model on the exposed surrounding rock contact surface of the current advancement segment.

(2) If the form of the support structure in the current support scheme is an anchor bolt, during simulating the boring process, a length, a diameter and pre-stress of the anchor bolt are simulated at the end of each segment of advancement by using a built-in anchor cable element in the FLAC3D software and the Fish language programming function of the FLAC3D software, thus obtaining the support structure model on the exposed surrounding rock contact surface of the current advancement segment to simulate the support effect after excavation.

The selection and modeling of the support structure are achieved in this step. In practical application, single-layer concrete shaft wall can be selected as the primary support structure. When simulating different boring and support sequences, whenever the surrounding rock is excavated, a shell structure model is immediately established on a newly exposed surrounding rock contact surface by using a built-in command flow module in the FLAC3D software based on a predetermined boring and support scheme of a single boring and support stroke of the shaft boring machine. The purpose of constructing the shell structure model is to simulate the concrete lining, which represents the concrete shaft wall's geometric shape and mechanical properties.

In another exemplary embodiment of the present disclosure, in step 105, during simulating the support effect, with the advancement of the boring machine, the support structure model expands accordingly to simulate its constraint and bearing effect on the newly exposed surrounding rock in real-time. By writing fish statements, the FLAC3D software is configured to monitor the contact pressure between the support structure and the surrounding rock, the relative displacement change between the support structure and the surrounding rock, as well as the stress distribution of the support structure at arranged monitoring points, thus obtaining the simulation result.

In another exemplary embodiment of the present disclosure, to evaluate the effectiveness and safety of the support structure and provide a basis for adjusting support parameters or optimizing the support scheme, after step 105, the method for simulating construction of the shaft boring machine further includes the following.

The maximum principal stress of the support structure is calculated based on the stress distribution of the support structure in the simulation result. Based on the maximum principal stress and an axial compressive strength of the support structure, the factor of safety of the construction process is calculated. A computation formula of the factor of safety is as follows:

$$K = \frac{\sigma_{cc}}{\sigma_{max}};$$

where K denotes a factor of safety; $\sigma_{cc}$ denotes an axial compressive strength of the support structure, in which when the support structure is in the form of the concrete shaft wall, the axial compressive strength of the support structure is the axial compressive strength of the concrete, in this case, a value of $\sigma_{cc}$ may be 20.1 MPa, and $\sigma_{max}$ denotes the maximum principal stress of the support structure.

When the factor of safety is less than or equal to a predetermined value, the current support timing, support parameters, and the form of the support structure are adjusted to optimize the current support scheme. The predetermined value may be set as 1. The current support scheme remains unchanged when the factor of safety exceeds the predetermined value.

Figure 3:
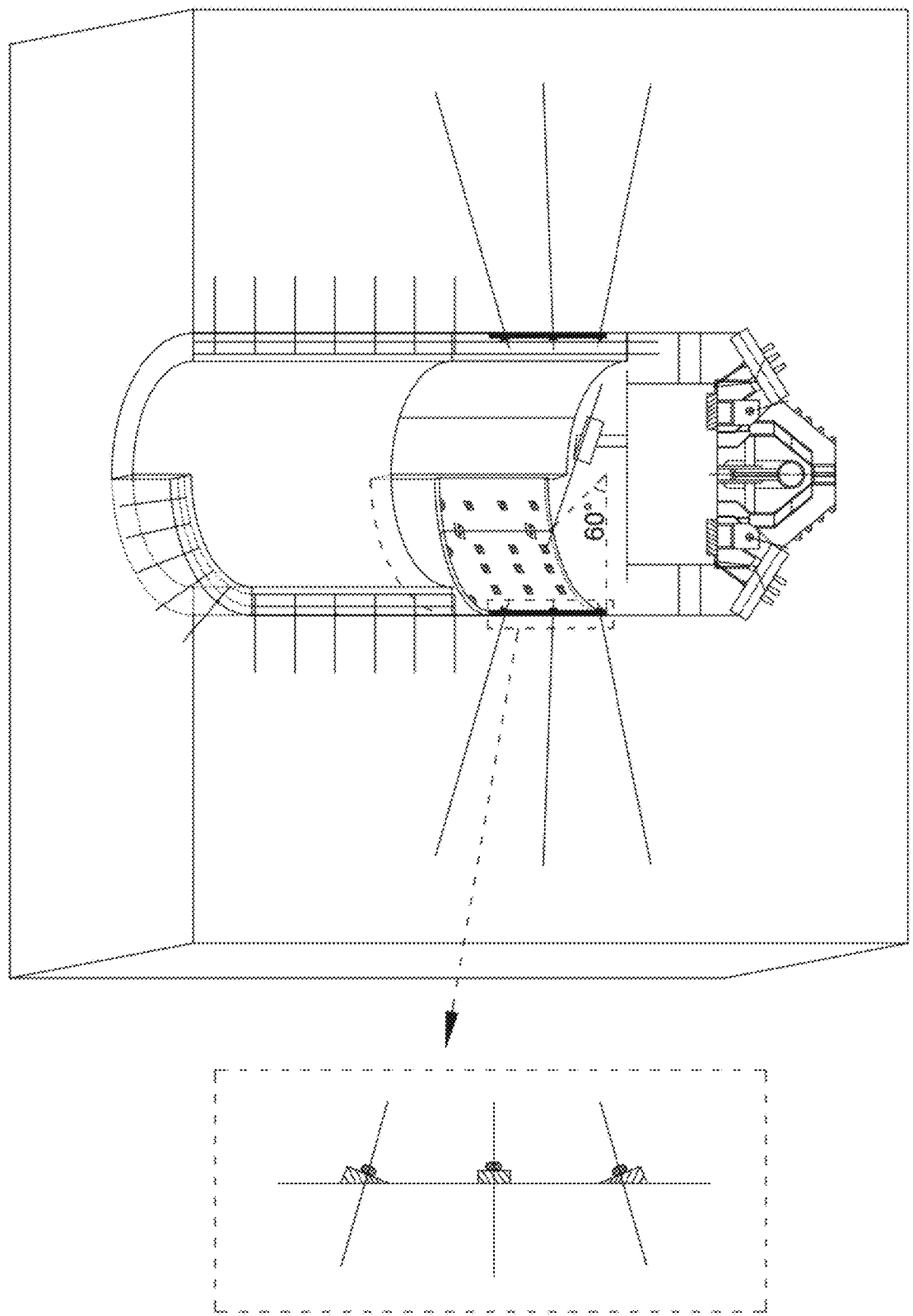
FIG. 3 is a schematic diagram of a numerical model for construction simulation according to an embodiment of the present disclosure.

Taking the deep excavation of a service well in West Anshan Iron ore as an implementation case, the whole process of integrated construction of boring and support in weak rock strata is simulated. At first, the numerical model for construction simulation is obtained through numerical simulation using the FLAC3D software, as shown in FIG. 3. An anchor bolt is shown in the left side of FIG. 3, and a corresponding right-side anchor bolt is partially embedded in a shaft wall of a rock simulation structure. There is a cutter head part of the shaft boring machine below the shaft. Based on the model shown in FIG. 3, above steps 102 to 105 are subsequently implemented to simulate the whole process of integrated construction of boring and support in weak rock strata, which reveals the spatiotemporal evolution of the stress and deformation of the shaft and provides a solid theoretical foundation for developing scientific and rational construction techniques. Through in-depth analysis of the simulation data, the construction scheme can be optimized, enabling the proposal of targeted boring strategies and support measures specific to the specific geological conditions of the West Anshan Iron ore to ensure the safe and efficient excavation of deep shafts.

In the above embodiment, the finite element numerical simulation method is used to achieve the construction simulation of the shaft boring machine in particular, the FLAC3D software, an advanced geotechnical engineering simulation platform, is used to conduct a meticulous and detailed simulation of the whole construction process. The FLAC3D software, with its powerful 3D modeling capability, support for a nonlinear material model, and excellent handling of complex boundary conditions, provides an ideal tool for accurately simulating shaft boring and support in weak rock strata. The detailed stress redistribution of the surrounding rock in the vicinity of the shaft excavation face is incorporated into the constructed numerical model, this is because the excavation operation will disrupt the original stress equilibrium, which may cause stress redistribution, and in turn affects the stability of the surrounding rock. Based on the on-site engineering geological conditions on the shaft engineering and the shaft size, the formation material characteristics and the size range for a three-dimensional finite element calculation model of the shaft are determined to ensure sufficiently accurate simulation of the critical construction segment.

During simulation, special attention must be paid to an interaction mechanism between the boring machine and the support structure. The boring machine, which operates in a high-stress environment, essentially performs a gradual unloading of the surrounding rock, and such a process needs to be accurately reproduced in the numerical simulation. To this end, a dynamic construction step simulation is adopted, which follows the actual construction process where the boring machine advances segment by segment (e.g., 1 meter per advancement), followed by the support structures segment by segment in sequence. After each advancement, the model immediately performs iterative calculations to reflect the changes in the stress state around the newly formed excavation face. Additionally, considering that the stress release of the surrounding rock in the actual condition is not instantaneous but a continuous process, it is ensured that in the simulation, the surrounding rock stress is not fully released during each iteration to maintain a high degree of consistency with the real-world condition.

Such a dynamic simulation cannot only reveal the stress and deformation evolution law of the shaft in transverse (radial) and longitudinal (axial) directions, but also can gain a deep understanding of stress concentration, displacement development, and potential local instability phenomena in the surrounding rock at different depths and stages of boring. The simulation result directly guides the optimal boring speed, support timing, support parameters (such as anchor bolt length, spacing, pre-tensioning force, etc.), and the support structural forms (such as shotcrete, pipe roofing, steel supports, etc.).

The above numerical simulation can achieve a comprehensive and dynamic simulation of the construction process of the shaft boring machine under deep shaft excavation conditions, including crucial links such as the stress-strain response of the surrounding rock, the interaction between the boring machine and the surrounding rock, and the construction and effectiveness of support structure, thus providing a strong theoretical support for construction process optimization and safety risk management.

Based on the same inventive concept, an embodiment of the present disclosure further provides an apparatus for simulating construction of a shaft boring machine for implementing the method for simulating construction of the shaft boring machine mentioned above. The solution to the problem provided by the apparatus is similar to the solution recorded in the above method. Therefore, the specific definition of one or more embodiments of the apparatus for simulating construction of the shaft boring machine below can refer to the definition of the method for simulating construction of the shaft boring machine above, and will not be repeated in detail here.

In an exemplary embodiment, the present disclosure provides an apparatus for simulating construction of the shaft boring machine, including:

a numerical model construction module, configured to construct a numerical model for construction simulation by using a finite element numerical simulation platform, where the numerical model for construction simulation includes a boring part model of a boring machine, a three-dimensional model of a surrounding rock, and a constitutive model for a surrounding rock material;

a parameter configuration module, configured to configure interaction simulation parameters, boundary conditions, and an initial state of the numerical model for construction simulation to obtain a parameter-configured numerical model for construction simulation;

a boring process simulation module, configured to simulate a boring process of the boring machine that advances axially segment by segment with a predetermined advancing distance in the parameter-configured numerical model for construction simulation, where the load identical to an actual boring thrust is applied at an excavation front at the beginning of each segment of advancement;

a support model construction module, configured to construct a support structure model on an exposed surrounding rock contact surface of a current advancement segment based on a current support scheme at the end of each segment of advancement, during simulating the boring process; and a support effect simulation module, configured to, simulate a support effect of the support structure based on the support structure model at the end of each segment of advancement to obtain a simulation result, during simulating the boring process, where the simulation result includes a contact pressure between the support structure and the surrounding rock, a relative displacement change between the support structure and the surrounding rock, and stress distribution of the support structure, the simulation result is used for determining a factor of safety of the construction process, and the factor of safety is used for optimizing the current support scheme.

In the apparatus for simulating construction of the shaft boring machine, to optimize the construction scheme and predict the possible problems, the construction process can be simply and accurately simulated by using a numerical simulation technique, thus providing powerful theoretical support for construction technology optimization and safety risk management and control.

Figure 4:
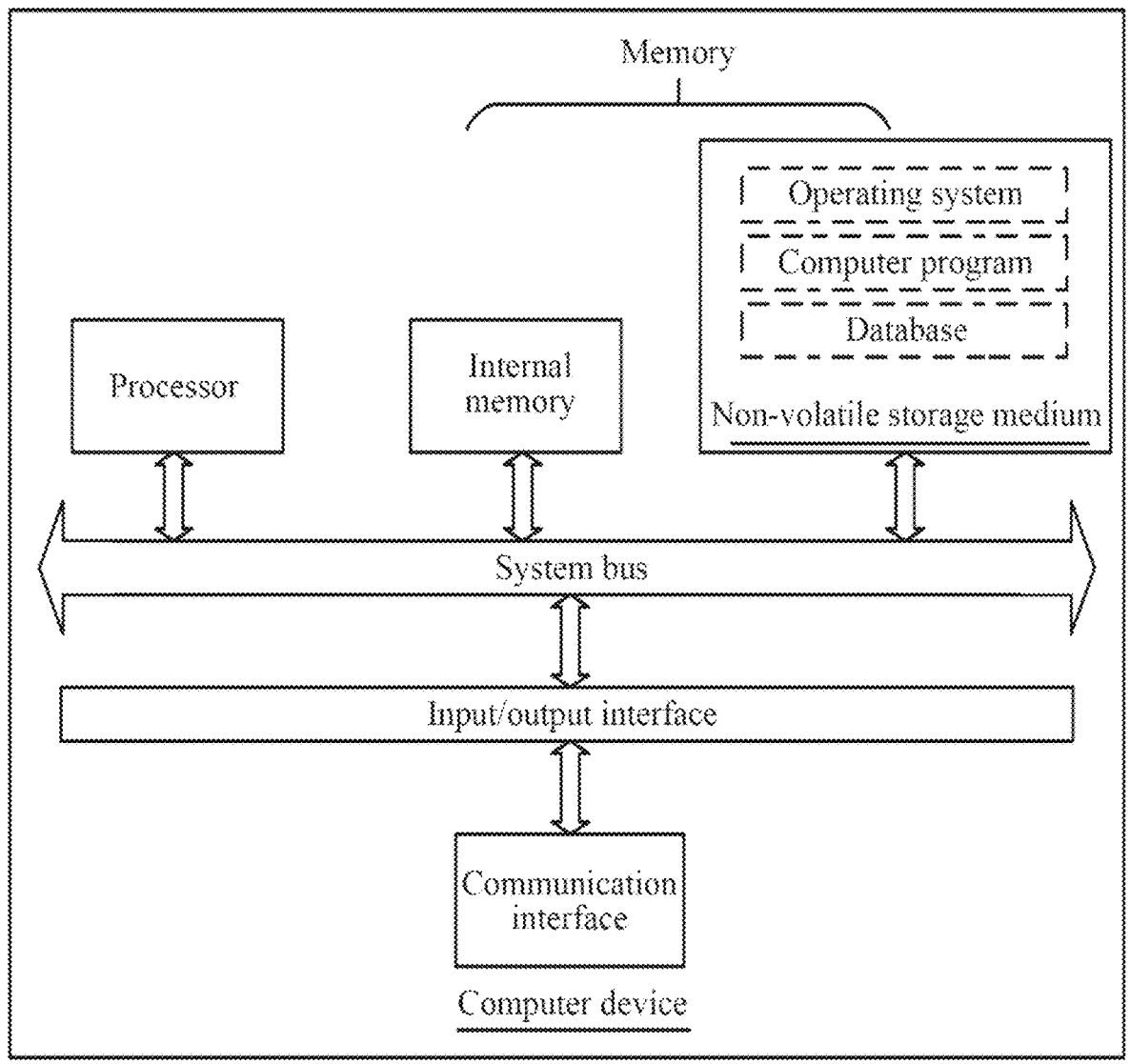
FIG. 4 is a structural schematic diagram of a computer device according to an embodiment of the present disclosure.

In an exemplary embodiment, a computer device is provided, which may be a server or a terminal, with an internal structural diagram shown in FIG. 4. The computer device includes a processor, a memory, an input/output interface (short for I/O), and a communication interface. The processor, the memory and the input/output interface are connected over a system bus, and the communication interface is connected to the system bus through the input/output interface. The processor of the computer device is configured to provide computing and control capabilities. The memory of the computer device includes a non-volatile storage medium, and an internal memory. An operating system, a computer program and a database are stored in the non-volatile storage medium. The internal memory provides an environment for the running of the operating system and the computer program in the non-volatile storage medium. The database of the computer device is used to store the numerical model for construction simulation. The input/output interface of the computer device is used to exchange information between the processor and an external device. The communication interface of the computer device is used to communicate with an external terminal through a network. The computer program, when executed by the processor, implements the method for simulating construction of a shaft boring machine.

Those skilled in the art may understand that the structure shown in FIG. 4 is only a block diagram of a part of the structure related to the scheme of the present disclosure, and does not constitute a limitation on the computer device to which the scheme of the present disclosure is applied. The specific computer device may include more or fewer components than those shown in the figure, or combine some elements, or have different component arrangements.

In an exemplary embodiment, a computer device, including a memory, a processor, and a computer program stored in the memory, is further provided. The processor, when executing the computer program, is configured to implement steps in the method embodiments above.

In an exemplary embodiment, a computer readable storage medium, having a computer program stored therein, is further provided. The computer program, when executed by a processor, can implement the steps in various method embodiments above.

In an exemplary embodiment, a computer program product, including a computer program, is provided. The computer program, when executed by a processor, can implement the steps in various method embodiments above.

It should be noted that the user information (including, but not limited to, user equipment information, user personal information, etc.) and data (including, but not limited to, data for analysis, data for storage, data for display, etc.) involved in the present disclosure are all information and data authorized by the user or fully authorized by all parties, and the collection, use, and processing of relevant data need to comply with applicable regulations.

Those skilled in the art can understand that all or part of the processes in the above embodiment methods can be completed by instructing related hardware through the computer program. The program can be stored in a non-volatile computer readable storage medium, and can include the processes of the above method embodiments when executed. Any reference to memory, database or other media used in the embodiments provided in the present disclosure may include at least one of a non-volatile memory and a volatile memory. The non-volatile memory may include a read only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, etc. The volatile memory may include a random access memory (RAM) or an external cache memory. By way of illustration than limitation, RAM may be in various forms, such as a static random access memory (SRAM) or a dynamic random access memory (DRAM).

The database involved in each embodiment provided by the present disclosure may include at least one of a relational database and a non-relational database. The non-relational database may include, but is not limited to, distributed databases based on a block chain. The processor involved in each embodiment provided by the present disclosure may be, but is not limited to, a general processor, a central processing unit, a graphics processing unit, a digital signal processor, a programmable logic, etc.

The technical features of the above embodiments can be combined at will. To make the description concise, not all possible combinations of the technical features in the above embodiments are described. However, it should be considered that these combinations of technical features fall within the scope recorded in this specification provided that these combinations do not conflict.

Specific examples are used herein to illustrate the principles and embodiments of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A method for simulating construction of a shaft boring machine, comprising following steps:
constructing a numerical simulation model by using a finite element numerical simulation platform, wherein the numerical simulation model comprises a boring part model of a boring machine, a three-dimensional model of a surrounding rock, and a constitutive model for a surrounding rock material;
configuring interaction simulation parameters, boundary conditions, and an initial state of the numerical simulation model to obtain a parameter-configured numerical simulation model;
simulating a boring process of the boring machine that advances axially segment by segment with a predetermined advancing distance in the parameter-configured numerical simulation model, wherein a load identical to an actual boring thrust is applied at an excavation front at beginning of each segment of advancement;
constructing a support structure model on an exposed surrounding rock contact surface of a current advancement segment based on a current support scheme at end of each segment of advancement, during simulating the boring process; and simulating, during simulating the boring process, a constraint and bearing applied on an exposed surrounding rock by a support structure based on the support structure model at the end of each segment of advancement to obtain a contact pressure between the support structure and the exposed surrounding rock, a relative displacement change between the support structure and the exposed surrounding rock, and stress distribution of the support structure, wherein the stress distribution of the support structure is used for determining a factor of safety of a construction process, and the factor of safety is used for optimizing the current support scheme;

wherein the step of constructing the numerical simulation model by using the finite element numerical simulation platform comprises:

constructing the boring part model of the boring machine by using a built-in mesh generation model in Fast Lagrangian Analysis of Continua in 3 Dimensions (FLAC3D) software based on actual data of a boring part of the boring machine, wherein the actual data comprises actual dimension, shape, and weight of a device;

constructing the three-dimensional model of the surrounding rock by using the built-in mesh generation model in the FLAC3D software based on geological survey data, wherein the geological survey data comprise types, thicknesses, and physical and mechanical properties of rock strata; and setting a Mohr-Coulomb constitutive model in the FLAC3D software as the constitutive model for the surrounding rock material;

wherein the step of configuring the interaction simulation parameters, the boundary conditions, and the initial state of the numerical simulation model comprises:

simulating an interaction between the support structure and the surrounding rock, and defining the interaction simulation parameters, wherein the interaction simulation parameters comprise a normal contact force on a contact surface between the support structure and the surrounding rock, a tangential contact force on the contact surface between the support structure and the surrounding rock, a friction coefficient on the contact surface between the support structure and the surrounding rock, and a relative displacement between the support structure and the surrounding rock;

setting the boundary conditions of the numerical simulation model, wherein the boundary conditions comprise a fixed boundary, a displacement boundary, and a load boundary; and initializing geo-stress distribution of the numerical simulation model based on geological survey data, and setting an initial displacement of the numerical simulation model to zero to complete setting of the initial state;

wherein the method further comprises:

in response to determining that the factor of safety is less than or equal to a predetermined value, adjusting current support timing, support parameters, and a form of the support structure to optimize the current support scheme; and in response to determining that the factor of safety is greater than the predetermined value, maintaining the current support scheme;

wherein the method further comprises:

calculating a maximum principal stress of the support structure based on the stress distribution of the support structure; and calculating, by using a computation formula of the factor of safety, the factor of safety of the construction process based on the maximum principal stress and an axial compressive strength of the support structure, wherein the computation formula of the factor of safety is $K=\sigma_{cc}/\sigma_{max}$ where K denotes the factor of safety, $\sigma_{cc}$ denotes the axial compressive strength of the support structure, and $\sigma_{max}$ denotes the maximum principal stress of the support structure.

2. The method according to claim 1, wherein the step of simulating the boring process of the boring machine that advances axially segment by segment with the predetermined advancing distance in the parameter-configured numerical simulation model comprises:

selecting an area to be excavated in the parameter-configured numerical simulation model; and simulating the boring process of the boring machine that advances axially segment by segment with the predetermined advancing distance in the area to be excavated by using a void element technique.

3. The method according to claim 1, wherein the step of constructing the support structure model on the exposed surrounding rock contact surface of the current advancement segment based on the current support scheme at the end of each segment of advancement, during simulating the boring process comprises:

in a case determining that a form of the support structure in the current support scheme is a concrete shaft wall, during simulating the boring process, simulating a geometrical shape and mechanical properties of the concrete shaft wall by using a built-in shell element in the FLAC3D software at the end of each segment of advancement, to obtain the support structure model on the exposed surrounding rock contact surface of the current advancement segment; and in a case determining that the form of the support structure in the current support scheme is an anchor bolt, during simulating the boring process, simulating a length, a diameter, and pre-stress of the anchor bolt by using a built-in anchor cable element in the FLAC3D software at the end of each segment of advancement to obtain the support structure model on the exposed surrounding rock contact surface of the current advancement segment.

4. A computer device, comprising:

a memory, a processor, and a computer program, stored on the memory and executable on the processor, wherein the processor, when executing the computer program, is configured to implement the method according to claim 1.

5. The computer device according to claim 4, wherein in the method, the step of simulating the boring process of the boring machine that advances axially segment by segment with the predetermined advancing distance in the parameter-configured numerical simulation model comprises:

selecting an area to be excavated in the parameter-configured numerical simulation model; and simulating the boring process of the boring machine that advances axially segment by segment with the predetermined advancing distance in the area to be excavated by using a void element technique.

6. The computer device according to claim 4, wherein in the method, the step of constructing the support structure model on the exposed surrounding rock contact surface of the current advancement segment based on the current support scheme at the end of each segment of advancement, during simulating the boring process comprises:

in a case determining that a form of the support structure in the current support scheme is a concrete shaft wall, during simulating the boring process, simulating a geometrical shape and mechanical properties of the concrete shaft wall by using a built-in shell element in the FLAC3D software at the end of each segment of advancement, to obtain the support structure model on the exposed surrounding rock contact surface of the current advancement segment; and in a case determining that the form of the support structure in the current support scheme is an anchor bolt, during simulating the boring process, simulating a length, a diameter, and pre-stress of the anchor bolt by using a built-in anchor cable element in the FLAC3D software at the end of each segment of advancement to obtain the support structure model on the exposed surrounding rock contact surface of the current advancement segment.

7. A non-transitory computer readable storage medium, having a computer program stored therein, wherein the computer program, when executed by a processor, implements the method according to claim 1.

8. The non-transitory computer readable storage medium according to claim 7, wherein in the method, the step of simulating the boring process of the boring machine that advances axially segment by segment with the predetermined advancing distance in the parameter-configured numerical simulation model comprises:

selecting an area to be excavated in the parameter-configured numerical simulation model; and simulating the boring process of the boring machine that advances axially segment by segment with the predetermined advancing distance in the area to be excavated by using a void element technique.

9. The non-transitory computer readable storage medium according to claim 7, wherein in the method, the step of constructing the support structure model on the exposed surrounding rock contact surface of the current advancement segment based on the current support scheme at the end of each segment of advancement, during simulating the boring process comprises:

in a case determining that a form of the support structure in the current support scheme is a concrete shaft wall, during simulating the boring process, simulating a geometrical shape and mechanical properties of the concrete shaft wall by using a built-in shell element in the FLAC3D software at the end of each segment of advancement, to obtain the support structure model on the exposed surrounding rock contact surface of the current advancement segment; and in a case determining that the form of the support structure in the current support scheme is an anchor bolt, during simulating the boring process, simulating a length, a diameter, and pre-stress of the anchor bolt by using a built-in anchor cable element in the FLAC3D software at the end of each segment of advancement to obtain the support structure model on the exposed surrounding rock contact surface of the current advancement segment.

* * * * *